US012802145B2

(12) United States Patent
Zheng et al.

(10) Patent No.: US 12,802,145 B2
(45) Date of Patent: Nov. 17, 2026

(54) INTELLIGENT POLLUTION AND CARBON REDUCTION METHOD BASED ON COMBUSTION CONTROL AND LOAD DISTRIBUTION

(71) Applicants: Zhejiang University, Hangzhou (CN); Jiaxing Research Institute, Zhejiang University, Jiaxing (CN)

(72) Inventors: Chenghang Zheng, Jiaxing (CN); Xiang Gao, Jiaxing (CN); Can Zhou, Jiaxing (CN); Zhongyang Zhao, Jiaxing (CN); Chao Yang, Jiaxing (CN); Weiguo Weng, Jiaxing (CN); Yongxin Zhang, Jiaxing (CN); Weihong Wu, Jiaxing (CN); Chang Tan, Jiaxing (CN); Qinwu Li, Jiaxing (CN); Libin Yu, Jiaxing (CN); Lianming Li, Jiaxing (CN); Jianglei Tian, Jiaxing (CN); Lingyu Shao, Jiaxing (CN)

(73) Assignees: Zhejiang University, Hangzhou (CN); Jiaxing Research Institute, Zhejiang University, Jiaxing (CN)

( * ) Notice: Subject to any disclaimer, the term of this patent is extended or adjusted under 35 U.S.C. 154(b) by 296 days.

(21) Appl. No.: 18/818,131

(22) Filed: Aug. 28, 2024

(65) Prior Publication Data

US 2025/0200676 A1 Jun. 19, 2025

(30) Foreign Application Priority Data

Aug. 29, 2023 (CN) ........................ 202311101016.7

(51) Int. Cl.
*G06Q 10/0631* (2023.01)
*G06Q 50/06* (2012.01)

(52) U.S. Cl.
CPC ....... *G06Q 50/06* (2013.01); *G06Q 10/06315* (2013.01)

(58) Field of Classification Search
CPC ......................... G06Q 50/06; G06Q 10/06315
USPC ............................................................. 431/2
See application file for complete search history.

(56) References Cited

U.S. PATENT DOCUMENTS

| | | | | |
|---|---|---|---|---|
| 2008/0147241 | A1* | 6/2008 | Tsangaris ............... | C10K 1/101 700/273 |
| 2022/0195948 | A1 | 6/2022 | Zafar et al. | |
| 2023/0033705 | A1 | 2/2023 | Gao et al. | |
| 2023/0385821 | A1 | 11/2023 | Sullivan et al. | |

* cited by examiner

*Primary Examiner* — Avinash A Savani

(57) ABSTRACT

In an intelligent pollution and carbon reduction method based on combustion control and load distribution, a data processing layer, a multi-unit load distribution and operation optimization layer and a single-unit boiler multi-objective combustion optimization layer are used. The data processing layer, the multi-unit load distribution and operation optimization layer and the single-unit boiler multi-objective combustion optimization layer are embedded in a power plant information system in the form of modules. A load distribution and operation optimization method for a multi-source fuel blending combustion unit with economy as an objective is provided to overcome the operation optimization difficulty of the key production process of a multi-source fuel blending combustion cogeneration unit, such as sludge drying-steam distribution.

9 Claims, 8 Drawing Sheets

INTELLIGENT POLLUTION AND CARBON REDUCTION METHOD BASED ON COMBUSTION CONTROL AND LOAD DISTRIBUTION

CROSS-REFERENCE TO RELATED APPLICATIONS

This application claims priority to Chinese Patent Application No. 202311101016.7 with a filing date of Aug. 29, 2023. The content of the aforementioned application, including any intervening amendments thereto, is incorporated herein by reference.

BACKGROUND OF THE INVENTION

1. Technical Field

The present invention relates to the technical field of thermal power unit operation optimization and, in particular, to an intelligent pollution and carbon reduction method based on combustion control and load distribution for a multi-source fuel blending combustion unit.

2. Description of Related Art

The blending combustion of low-carbon/zero-carbon fuels such as sludge and biomass can reduce fuel costs for power plants and also reduce carbon emissions from power plants. It has become a key way to deeply reduce carbon emissions in the power/cogeneration industry and has been applied in many power plants at home and abroad. Compared with a traditional coal-fired header-system cogeneration unit, the header-system cogeneration unit with coal-sludge multi-source fuel blending combustion can reduce fuel costs for power plants and maximize the optimal allocation of resources, thereby becoming an effective way to break the siege of sludge and garbage. However, due to the unstable calorific value and different physical and chemical properties of multi-source fuels, it is difficult to establish a stable fuel-load mapping relationship, which limits the economic efficiency of the unit.

In the process of operation and control of thermal power plants, due to the different equipment and operation levels of different power plants and different performance of units, it is necessary to adjust the effective configuration between energy resources and the operating status of the units to comprehensively analyze the optimal operation mode and optimal load distribution plan of units in the plants, and fully tap the economic potential of units in the plants. In addition, taking a cogeneration unit as an example, the traditional operation mode of determining electricity by heat is subject to the constraints of the unit's operating status. In the process of frequent load changes, it may lead to energy waste under low-load conditions and insufficient energy supply under high-load conditions. The flexibility of the unit operation has a large room for improvement, and it is necessary to establish a more flexible unit operation strategy through a more reasonable energy planning method.

The flexible operation of thermal power units puts forward higher requirements on the unit's deep peak regulation, load ramp and rapid start-stop capabilities. How to establish a parameter optimization strategy for a single unit in the face of rapid and large-scale variable load conditions, obtain the optimization instructions of key combustion operation parameters in real time, and make timely and accurate control adjustments to the optimization instructions has become a difficult problem that needs to be solved in a boiler combustion system under the background of flexible operation control. The existing multi-objective combustion optimization based on data mining and intelligent optimization algorithms is still an open-loop optimization method, and it is difficult to achieve the multi-objective optimization of the system under the variable load conditions of the boiler.

BRIEF SUMMARY OF THE INVENTION

In order to overcome the shortcomings of the prior art, the present invention provides a concept of "multi-unit load distribution optimization-single unit combustion control" for flexible control of multi-level and multi-energy flows, establishes an intelligent pollution and carbon reduction method based on combustion control and load distribution, and solves the problems of pollution and carbon reduction at the source of boilers and flexible control of multi-unit operation under complex working conditions such as variable load/variable fuel. Specifically, the intelligent pollution and carbon reduction method based on combustion control and load distribution is manifested as follows: starting from the overall situation of a coal-fired power plant, in view of the load distribution and flexible operation difficulties caused by the variable coal quality and complex fuel characteristics of a multi-source fuel unit, an optimal load distribution and flexible operation method for a multi-source fuel blending combustion unit with economy as an objective is provided to adapt to complex fuels, solve the operation optimization difficulty of the key production process of a multi-source fuel blending combustion cogeneration unit, such as sludge drying-steam distribution, and realize the optimal header-system multi-unit load distribution and flexible operation of a multi-source fuel unit. For single units with variable loads and fuels, existing combustion control methods have the following disadvantages: difficulty in modeling, complex optimization calculations, and difficulty in implementing them under closed-loop conditions. Based on an idea of mechanism analysis, optimization model construction, closed-loop simulation verification and parameter adjustment, that is, by firstly analyzing the mechanism of the key operation parameters of boiler combustion, and in combined with a furnace combustion mechanism, determining the air-coal ratios of auxiliary air, close-coupled over fire air and separated over fire air as decision parameters, and further constructing an optimization model of total air volume optimization for the boiler and stratified air distribution optimization for the boiler to optimize the total air volume and stratified air distribution of the boiler, carrying out parameter setting and closed-loop simulation verification under stable load and variable load conditions, and also adding mechanism correction parameters to an algorithm loop to improve model generalization ability, the present invention achieves the improvement of unit energy efficiency and reduction of pollutant emissions.

The intelligent pollution and carbon reduction method based on combustion control and load distribution uses a data processing layer, a multi-unit load distribution and operation optimization layer and a single-unit boiler multi-objective combustion optimization layer; the data processing layer, the multi-unit load distribution and operation optimization layer and the single-unit boiler multi-objective combustion optimization layer are embedded in a power plant information system in the form of modules, and communicate with the power plant information system in real time;

the data processing layer includes a data clustering submodule, a data delay processing submodule, and a data filtering submodule and is configured to acquire historical data about fuel amount and fuel-specific properties from the power plant information system, and carry out screening, clustering, time delay processing and data filtering on offline data of multi-source fuel blending combustion units to cluster and deeply segment data about multi-source fuels with different calorific values and blending ratios into multiple operating condition intervals to obtain stable data suitable for subsequent modeling;

the multi-unit load distribution and operation optimization layer includes a multi-unit load distribution optimization model and a multi-unit flexible operation optimization model;

the multi-unit load distribution optimization model is configured to, based on the data processing layer, obtain stable data suitable for modeling, cluster and segment the data about multi-source fuels with different calorific values and blending ratios into sub-intervals with similar fuel characteristics, and on this basis establish a fuel consumption-steam flow model with different fuel characteristics for different units; further, with coal consumption economy as an objective, set start-stop constraints, capacity constraints and load ramp constraints for units, and when the total thermal power load of the power plant changes, match the fuel data of the day with the historical operation data to obtain a stable fuel consumption-load mapping relationship, and distribute the real-time steam production of multiple units by using an adaptive pollution and consumption reduction optimization algorithm to achieve load distribution optimization for multiple units;

the multi-unit flexible operation optimization model is configured to, based on the multi-unit load distribution optimization model, according to sludge drying and the multi-source fuel pretreatment of biomass and domestic waste on the same day and in consideration of a steam flow required for sludge drying at each time, adopt the adaptive pollution and consumption reduction optimization algorithm for flexible load distribution, obtain a steam distribution method of the sludge/garbage drying process and a load distribution method of each multi-source fuel unit, and further optimize the steam flow distribution for multiple units hour by hour;

the single-unit boiler multi-objective combustion optimization layer is configured to, based on the idea of mechanism analysis, optimization model construction, closed-loop simulation verification and parameter adjustment, firstly analyze the mechanism of key operating parameters of boiler combustion, and in combined with a furnace combustion mechanism, determine air-coal ratios of auxiliary air, close-coupled over fire air, and separated over fire air as decision parameters, and further construct an optimization model of total air volume optimization for the boiler and stratified air distribution optimization for the boiler to optimize the total air volume distribution of the boiler, and carry out parameter setting and closed-loop simulation verification under stable load and variable load conditions, thereby achieving the improvement of unit energy efficiency and reduction of pollutant emissions.

Preferably, the data clustering submodule is configured to acquire the daily multi-source fuel blending ratio, the calorific value of coal entering the boiler, and the fuel calorific value of sludge and garbage from historical operation data, and cluster the data with the blending ratio and the fuel calorific value as variables, and segment the data into different fuel working conditions in consideration of the characteristics of the clustered data, wherein the calorific values and physical and chemical properties of fuels under the working conditions are similar, and the clustering effect is expressed as follows:

$$SC(i) = \frac{b(i) - a(i)}{\max\{a(i), b(i)\}}$$

where SC(i) is a clustering effect coefficient; a(i) is an average distance between each data point i and all other data points in the same cluster; b(i) is an average distance between the data point i and all data points in another cluster closest to the data point i.

Preferably, the data delay processing submodule is configured to select, from the historical operation data, a variable load condition segment where the boiler inlet fuel amount changes and the main air flow parameters of primary air and secondary air remain unchanged, analyze the delay of the change of the boiler outlet steam flow and the boiler inlet fuel amount, and eliminate the time difference of response to the data about boiler outlet steam flow and boiler inlet fuel amount in a subsequent process.

Preferably, the data filtering submodule further performs data filtering on the data about the boiler outlet steam flow and the boiler inlet fuel amount after data delay processing, and uses a Savitzky-Golay filter to filter the data in consideration of the data characteristics of the boiler inlet fuel amount to eliminate the high-frequency noise and jitter of a boiler inlet fuel signal.

The multi-unit load distribution optimization model sets start-stop constraints, capacity constraints and load ramp constraints for units with coal consumption economy as an objective, realizes the load distribution optimization of multiple units in an upper structure, and obtains the load distribution optimization plan of each unit with economy as an objective when the output of multiple units is determined; in the multi-unit load distribution optimization with fuel consumption economy as an objective, in order to balance the best economic benefits obtained by power plant operation, steam consumption rate, heat consumption rate, power supply cost, fuel consumption and other indicators are usually used to measure the economy of multi-unit operation. However, since the unit energy output forms include heat, electricity, gas, cold and other energy sources, the operation economy of multiple units cannot be evaluated just by steam consumption rate and heat consumption rate. Similarly, the power supply cost cannot be directly linked to the economy of the cogeneration unit. The fuel cost plays a decisive role in the change of the economic benefits of multiple units. The fuel consumption can directly reflect the economy of units when a power plant operates stably. Therefore, fuel consumption is considered herein as an objective function.

Preferably, the fuel consumption-steam flow model is expressed as:

$$B_i = F_i(x_i) = a_i x_i^2 + b_i x_i + c_i$$

where, $B_i$ is the fuel consumption of an i-th unit, $F_i(\chi_i)$ is a steam flow function sign, $x_i$ is the boiler outlet steam flow of the i-th unit, and $a_i$, $b_i$ and $c_i$ are correlation coefficients of fuel consumption and boiler outlet steam flow.

Preferably, the objective function of fuel consumption is expressed as:

$$J_{eco}=\min\left(\sum_{i=1}^{n}B_i\right)=\min\left(\sum_{i=1}^{n}F_i(x_i)n\right)$$

where, $J_{eco}$ represents the objective function of fuel consumption, $B_i$ represents the fuel consumption of the i-th unit; $x_i$ is the load of the i-th unit, and the load of a circulating fluidized bed unit is characterized by main steam flow rate; n represents the number of units operating in the power plant; $F_i(\chi_i)$ represents the fuel consumption characteristic model of the i-th unit.

Preferably, the setting start-stop constraints, capacity constraints and load ramp constraints for units is to optimize the load distribution of multiple units when the start-stop status of each unit is determined, and also set a unit steam balance constraint, a unit load constraint and a unit load ramp rate constraint; Further preferably, the unit steam balance constraint is expressed as:

$$X=\sum_{i=1}^{n}x_i$$

where, X is the steam flow of multiple units, and $\chi_i$ is the steam flow of the i-th operating unit.

Further preferably, in order to maintain safe and stable operation of the units, the load of each unit needs to be controlled within a certain range, and the unit load constraint is expressed as:

$$x_{imin}<x_i<x_{imax}$$

where $\chi_{imin}$ is the minimum load of the i-th operating unit, and $\chi_{imax}$ is the maximum load of the i-th operating unit.

Further preferably, the unit load ramp rate constraint is expressed as:

$$0<|x_{it}-x_{i,t-1}|<\Delta t v_{i-}$$

$$0<|x_{it}-x_{i,t-1}|<\Delta t v_{i+}$$

where, $x_{it}$ and $x_{i,t-1}$ represent the main steam flow rates of the i-th unit at time t and the time before time t respectively; Δt represents the time of load change; $v_{i+}$ and $v_{i-}$ represent the load increase velocity and load decrease velocity of the i-th unit respectively.

Preferably, in the multi-unit flexible operation optimization model, the fuel consumption of multiple units is used as an objective function, but unlike the load distribution optimization model, the total fuel consumption within a period of time is used to measure the objective function of the flexible operation optimization model.

Further preferably, the total fuel consumption of the multiple units within the period of time is expressed as:

$$J'_{eco}=\min\left(\sum_{t=1}^{t'}B_t\Delta T\right)$$

where, $J_{eco}'$ represents the total fuel consumption of multiple units in a period of time, t' represents flexible operation time, $B_t$ represents the total fuel consumption of multiple units at time t, and ΔT represents a unit interval time.

Further preferably, the constraints for optimizing the steam flow of multiple units include a constraint on steam consumption for sludge drying and a constraint on total steam capacity.

Further preferably, the constraint on steam consumption for sludge drying is expressed as:

$$0<x'_t<x'_{max}$$

where $x'_t$ represents the steam consumption for sludge drying at time t, and $x'_{max}$ represents the maximum steam consumption when a sludge dryer is running at full load.

Further preferably, the fuel consumption is reduced by redistributing the steam flow at each time, so that in the same time period, the total steam consumption for drying all the sludge is unchanged before and after optimization, and the constraint on total steam capacity is expressed as:

$$Q=Q'$$

where Q represents steam consumption for drying all sludge before optimization, and Q' represents steam consumption for drying all sludge after optimization.

Preferably, the structure of the adaptive pollution and consumption reduction optimization algorithm is as follows: the first step is to initialize the total steam flow X of multiple units and the start-stop status of multiple units, the second step is to initialize algorithm parameters and particle properties, randomly generate a certain number of particles, and determine the position and velocity of each particle, and calculate particle fitness, the third step is to determine whether the particle fitness meets mutation conditions, and determine the position and velocity of each particle when the particle fitness meets the mutation conditions; the fourth step is to determine the steam flow $x_i$ of each unit through the particle fitness calculation, and the fifth step is to output the steam flow $x_i$ of each unit when the constraint on steam consumption for sludge drying and the constraint on total steam capacity are met; the sixth step is to return to update the particle velocity and particle position and re-calculate the particle fitness when the constraints are not met.

Further preferably, during an algorithm iteration process, the mutation probability of the algorithm is dynamically adjusted according to the rate of change of an objective function value; when the objective function value changes slowly, the mutation probability is appropriately increased to promote the global search of the algorithm; when the objective function value changes rapidly, the mutation probability is appropriately reduced to prevent the search from falling into the local optimal solution too early; when the search state distribution is even and few local optimal solutions appear, a mutation range is appropriately expanded to promote the global search; when the search state distribution is uneven and multiple local optimal solutions appear, the mutation range is appropriately narrowed to prevent the search from falling into the local optimal solution too early.

Preferably, in the optimization model of total air volume optimization for the boiler and stratified air distribution optimization for the boiler, after the air-coal ratio setting value combined with the AGC (automatic generation control) load instruction is issued, a DCS directly calculates an amount of coal fed, a current boiler inlet air volume is further calculated according to the amount of coal fed, and the boiler inlet volume control of auxiliary air, close-coupled over fire air and separated over fire air is realized by valve control; further calculations are performed to obtain the comprehensive objective function value of current kilowatt-hour coal consumption and NOx emission concentration, and data is transmitted to an $ACR_{AA}$ optimization controller, an $ACR_{CCOFA}$ optimization controller and an $ACR_{SOFA}$ optimization controller to optimize three air-coal ratios online, thus completing a round of online optimization control cycle. In the online optimization loop of the three air-coal ratios, the mechanism correction parameters of the auxiliary air, close-coupled over fire air and separated over fire air are added to achieve parameter fine-tuning of control models under different initial conditions, so as to improve the response speed of the air-coal ratios to the objective functions and make the algorithm converge better. Under multiple combustion conditions, the values of the mechanism correction parameters of auxiliary air, close-coupled over fire air and separated over fire air are between 1 and 1.1, which depends on the NOx emission concentration and coal consumption per kilowatt-hour under the initial conditions. By adding this module, part of the prior mechanism knowledge is integrated into the optimization control method to improve the generalization of the model.

Preferably, in the optimization model of total air volume optimization for the boiler and stratified air distribution optimization for the boiler, fuel price, boiler operation data and simulation data are substituted into a fuel cost model and a denitrification cost model to calculate fuel cost and denitrification cost, and the weight in the comprehensive objective function is further defined from the perspective of cost; the comprehensive objective function value of the coal consumption per kilowatt-hour and the NOx concentration is expressed as:

$$J_{MESC} = pM_{CCR} + qM_{NOx}$$

where, $J_{MESC}$ represents the comprehensive objective function value of coal consumption per kilowatt-hour and NOx concentration, p and q are weight factors of fuel cost and denitrification cost in the comprehensive objective function and satisfy p+q=1; $M_{CCR}$ represents the fuel cost; $M_{NOx}$ represents the denitrification cost.

Further preferably, the coal consumption per kilowatt-hour is expressed as:

$$b = 10^6 B_c Q_{net,ar}/29300P$$

wherein, b is the coal consumption per kilowatt-hour of a unit; $B_c$ is the amount of coal fed to the boiler; $Q_{net,ar}$ is the low calorific value of the coal fed into the boiler; and P is the active power of a unit.

Further preferably, the fuel cost is expressed as:

$$M_{CCR} = b \times \frac{m_c}{10^6}$$

where, b is the coal consumption per kilowatt-hour of a unit; $m_c$ is the fuel price; and $M_{CCR}$ is the fuel cost.

Further preferably, the denitrification cost is expressed as:

$$M_{NOx} = c_{NO_x} \times B \times V_{gv} \times Q_{NH_3} \times \lambda \times \frac{M_{NH_3}}{P\gamma}$$

where, $M_{NOx}$ is the denitrification cost; $C_{NO\chi}$ is the $NO\chi$ concentration at the boiler outlet; B is the amount of coal fed; $V_{gv}$ is the dry flue gas volume; $Q_{NH3}$ is the theoretical amount of ammonia required for $NO\chi$ removal; $\lambda$ is ammonia nitrogen ratio; $M_{NH_3}$ is liquid ammonia cost; $\gamma$ is unit load rate.

Preferably, in the optimization model of stratified air distribution optimization for the boil, the constraints on the air-coal ratio of auxiliary air, the air-coal ratio of close-coupled over fire air, and the air-coal ratio of separated over fire air are:

$$\psi_{ACR_{AA}min} < \psi_{ACR_{AA}} < \psi_{ACR_{AA}max}$$

$$\psi_{ACR_{CCOFA}min} < \psi_{ACR_{CCOFA}} < \psi_{ACR_{CCOFA}max}$$

$$\psi_{ACR_{SOFA}min} < \psi_{ACR_{SOFA}} < \psi_{ACR_{SOFA}max}$$

wherein, $\psi_{ACR_{AA}}$, $\psi_{ACR_{CCOFA}}$, and $\psi_{ACR_{SOFA}}$ represent the values of the air-coal ratio of auxiliary air, the air-coal ratio of close-coupled over fire air and the air-coal ratio of separated over fire air, respectively; $\psi_{ACR_{AA}min}$ and $\psi_{ACR_{AA}max}$ represent the minimum and maximum values of the air-coal ratio of auxiliary air under normal operating conditions, respectively; $\psi_{ACR_{CCOFA}min}$ and $\psi_{ACR_{CCOFA}max}$ represent the minimum and maximum values of the air-coal ratio of close-coupled over fire air under normal operating conditions, respectively; $\psi_{ACR_{SOFA}min}$ and $\psi_{ACR_{SOFA}max}$ represent the minimum and maximum values of the air-coal ratio of separated over fire air under normal operating conditions, respectively.

Preferably, in the optimization model of total air volume optimization for the boiler and stratified air distribution optimization for the boiler, a multi-input dynamic extremum seeking control algorithm is introduced for the problem of stratified air distribution optimization for the boiler, and parameter setting and closed-loop simulation verification are carried out under stable load and variable load conditions. The main parameters of the multi-input dynamic extremum seeking control algorithm include high-pass filter parameter $\omega_h$, low-pass filter parameter $\omega_l$, adaptive gain parameter k, disturbance amplitudes $\alpha$, $\beta$ and disturbance frequency $\omega$, which have a certain influence on the convergence speed, stability and extremum seeking accuracy of the control algorithm. Therefore, on the basis of considering improving the extremum seeking accuracy of the system, the convergence speed and stability of the algorithm are improved by setting the parameters such as high-pass filter parameter $\omega_h$, low-pass filter parameter $\omega_l$, adaptive gain parameter k, disturbance amplitude $\alpha$, $\beta$ and disturbance frequency $\omega$.

Further preferably, during the parameter setting of the multi-input dynamic extremum seeking control algorithm, in the structural design of each input parameter loop, two control structures that adapt to a variation range of the comprehensive objective function are designed. In actual control, the specific control structure can also be selected on the basis of prior mechanism knowledge and initial combustion state parameters.

The present invention has the following beneficial effects:

(1) According to the fuel consumption-steam flow mapping relationship, after boiler inlet fuel consumption increases for a certain period of time, the steam flow increases accordingly, indicating that there is a time delay in the fuel consumption-steam flow. In order to ensure the accuracy of the fuel consumption-steam flow model, the present invention eliminates the pure delay of the fuel consumption-steam flow mapping relationship to ensure the accuracy of the established mapping relationship. The boiler inlet fuel consumption is monitored in real time by a measuring device on a conveyor belt. However, due to factors such as the accuracy of the instrument itself, the measurement environment and the difference in coal types, the measurement data contains certain high-frequency noise and is usually random, nonlinear and presents Gaussian distribution. Therefore, in the real-time monitoring and control of the amount of coal fed, these random errors need to be effectively processed and filtered to improve the accuracy of the measurement data; for the filtered data segment, the change trend of the original data is retained, the noise of the original data is well removed and the fluctuation of the fuel consumption data is reduced.

(2) Compared with traditional genetic algorithms and gray wolf algorithms, the adaptive pollution and consumption optimization algorithm of the present invention has a high global search capability and an ability to jump out of the local optimal solution during the solving process, and shows good optimization effects in static optimization. Compared with genetic algorithms and gray wolf algorithms, the algorithm of the present invention can reduce fuel consumption by at least 5% through optimization, and can further reduce pollution and carbon emissions at the source by at least 5%.

(3) The power plant operators can distribute the steam flow involved in drying at each time within the maximum drying power of the sludge dryer according to the daily planned sludge incineration volume, thereby adjusting the load of the unit. Typically, the operators of the unit use a constant volume of steam to dry wet sludge in order to reduce the operating frequency. The present invention adopts a multi-unit flexible operation optimization model, with an objective of improving the overall economy of multiple units. By redistributing the steam flow used for drying wet sludge within a period of time, the fuel consumption of multiple units within a time period is minimized; the optimization model established optimizes the start-stop load conditions of single boilers under different loads, the total loads can converge to set load values, and there are no abnormal optimization conditions such as data jumps and optimization over-limits. The results of multi-period distribution verification and typical day flexible operation verification show that after use of the load distribution optimization and flexible operation method for a multi-source fuel blending combustion unit, the fuel saving effect can reach up to 16% or above, and further the overall pollution and carbon emissions can be reduced at the source of a coal-fired power plant by 16% or above.

(4) The frequent load changes and complex and changeable coal quality characteristics of multi-source fuel units cause the optimal air-coal ratios of the units to change continuously with the operating conditions. For the traditional air volume distribution method that relies on empirical knowledge, it is difficult to determine the optimization of the air-coal ratios under complex operating conditions, and it is also difficult to ensure efficient combustion in the furnace. In order to realize the combustion control of boilers under variable loads in the context of flexible operation and control, a complete optimization process based on mechanism analysis, optimization model construction, closed-loop simulation verification and parameter adjustment is provided. Under complex combustion conditions such as high coal consumption and high NOx, low coal consumption and high NOx, and high coal consumption and low NOx, the unit's coal consumption per kilowatt-hour and NOx emission concentration are both reduced, with the maximum reduction reaching 9 g/kWh and 120 mg/m$^3$ respectively. The model has good stability and high adaptive optimization capability under variable load conditions and coal quality disturbance conditions.

BRIEF DESCRIPTION OF THE SEVERAL VIEWS OF THE DRAWINGS

In order to more clearly illustrate the technical solutions in the embodiments of the present invention or the prior art, the accompanying drawings required for use in the embodiments are briefly introduced below.

DETAILED DESCRIPTION OF THE INVENTION

In order to more clearly illustrate the technical solution of the present invention, the present invention is further described below in conjunction with the accompanying drawings and embodiments, but the scope of the present invention is not limited thereto. In the following description, a large number of specific details are given to provide a more thorough understanding of the present invention. However, it is obvious to those skilled in the art that the present invention can be implemented without one or more of these details. It should be understood that the implementation of the present invention is not limited to the following embodiments, and any formal modifications and/or changes made to the present invention will fall within the scope of the present invention.

Embodiment 1

For sludge-combustion circulating fluidized bed cogeneration units 0 #-5 #, an intelligent pollution and carbon reduction system and method based on combustion control and load distribution are provided.

Figure 1:
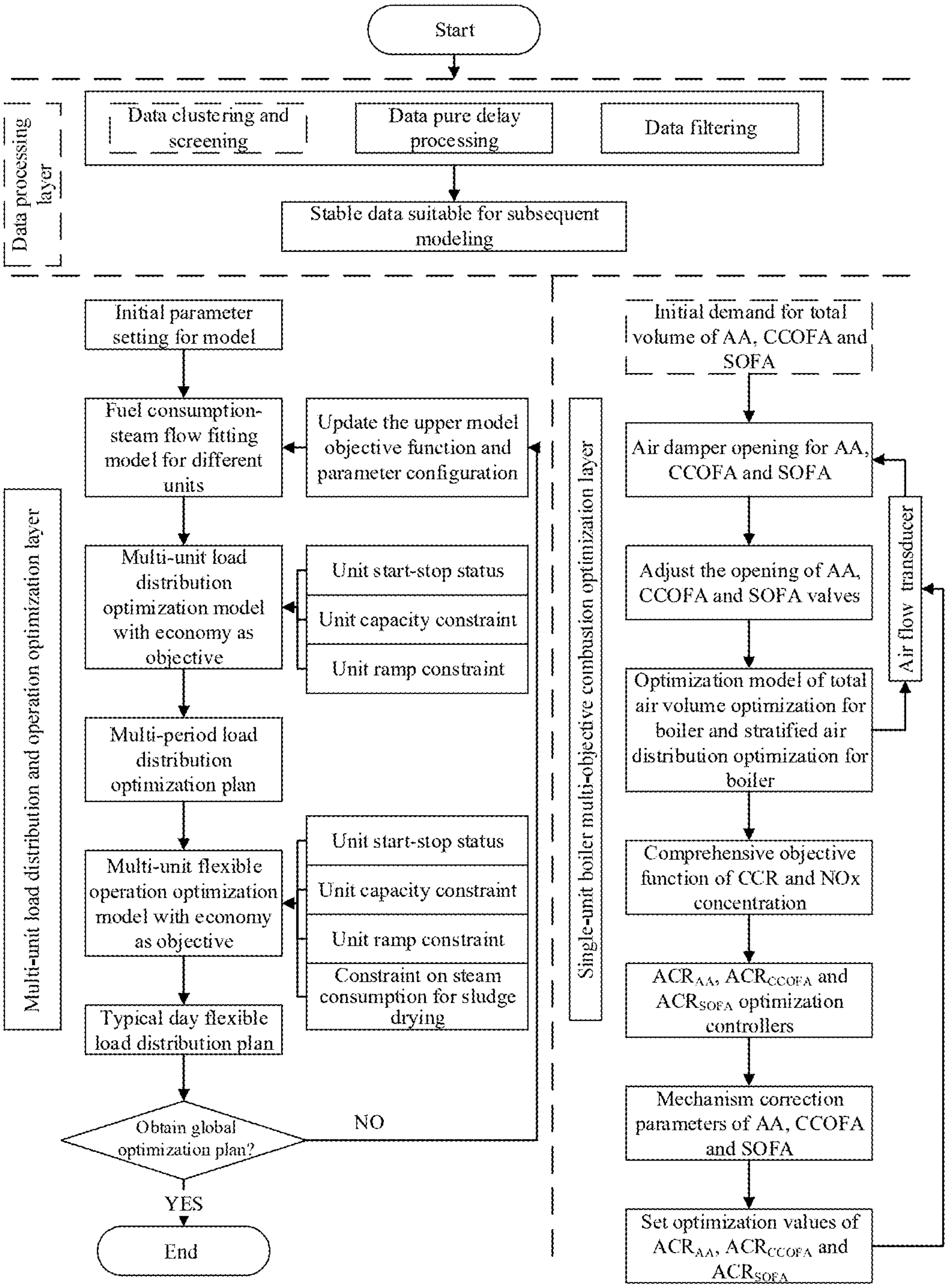
FIG. 1 is a flowchart of an intelligent pollution and carbon reduction method based on combustion control and load distribution.

Referring to FIG. 1, the intelligent pollution and carbon reduction method based on combustion control and load distribution uses a data processing layer, a multi-unit load distribution and operation optimization layer and a single-unit boiler multi-objective combustion optimization layer; the data processing layer, the multi-unit load distribution and operation optimization layer and the single-unit boiler multi-objective combustion optimization layer are embedded in a power plant information system in the form of modules, and communicate with the power plant information system in real time;

the data processing layer includes a data clustering submodule, a data delay processing submodule, and a data filtering submodule and is configured to acquire historical data about fuel amount and fuel-specific properties from the power plant information system, and carry out screening, clustering, time delay processing and data filtering on offline data of multi-source fuel blending combustion units to cluster and deeply segment data about multi-source fuels with different calorific values and blending ratios into multiple operating condition intervals to obtain stable data suitable for subsequent modeling;

the multi-unit load distribution and operation optimization layer comprises a multi-unit load distribution optimization model and a multi-unit flexible operation optimization model;

the multi-unit load distribution optimization model is configured to, based on the data processing layer, obtain stable data suitable for modeling, cluster and segment the data about multi-source fuels with different calorific values and blending ratios into sub-intervals with similar fuel characteristics, and on this basis establish a fuel consumption-steam flow model with different fuel characteristics for different units; further, with coal consumption economy as an objective, set start-stop constraints, capacity constraints and load ramp constraints for units, and when the total thermal power load of the power plant changes, match the fuel data of the day with the historical operation data to obtain a stable fuel consumption-load mapping relationship, and distribute the real-time steam production of multiple units by using an adaptive pollution and consumption reduction optimization algorithm to achieve load distribution optimization for multiple units;

the multi-unit flexible operation optimization model is configured to, based on the multi-unit load distribution optimization model, according to sludge drying and the multi-source fuel pretreatment of biomass and domestic waste on the same day and in consideration of a steam flow required for sludge drying at each time, adopt the adaptive pollution and consumption reduction optimization algorithm for flexible load distribution, obtain a steam distribution method of the sludge/garbage drying process and a load distribution method of each multi-source fuel unit, and further optimize the steam flow distribution for multiple units hour by hour;

the single-unit boiler multi-objective combustion optimization layer is configured to firstly analyze the mechanism of key operating parameters of boiler combustion (that is, in a multi-objective combustion control scenario, auxiliary air, close-coupled over fire air and separated over fire air can affect the coal consumption per kilowatt-hour and the furnace NOx concentration in a nonlinear mapping manner), and in combined with a furnace combustion mechanism, determine the air-coal ratios of auxiliary air, close-coupled over fire air, and separated over fire air as decision parameters; then, define a comprehensive objective function including coal consumption per kilowatt-hour and NOx concentration and assign corresponding weights to transform a multi-objective optimization problem into a single-objective optimization problem; and further construct an optimization model of total air volume optimization for the boiler and stratified air distribution optimization for the boiler to optimize the total air volume distribution of the boiler, and introduce a multi-input dynamic extreme search control algorithm for the problem of stratified air distribution optimization for the boiler, analyze and match the time scale of an algorithm layer, an incentive layer, an operation layer and a bottom layer, carry out parameter setting and closed-loop simulation verification under stable load and variable load conditions, and also add mechanism correction parameters to an algorithm loop to improve model generalization ability, the present invention achieves the improvement of unit energy efficiency and reduction of pollutant emissions, thereby achieving the improvement of unit energy efficiency and reduction of pollutant emissions.

The data clustering submodule is configured to acquire the daily multi-source fuel blending ratio, the calorific value of coal entering the boiler, and the fuel calorific value of sludge and garbage from historical operation data, and cluster the data with the blending ratio and the fuel calorific value as variables, and segment the data into different fuel working conditions in consideration of the characteristics of the clustered data, wherein the calorific values and physical and chemical properties of fuels under the working conditions are similar, and the clustering effect is expressed as follows:

$$SC(i) = \frac{b(i) - a(i)}{\max\{a(i), b(i)\}}$$

where SC(i) is a clustering effect coefficient; a(i) is an average distance between each data point i and all other data points in the same cluster; b(i) is an average distance between the data point i and all data points in another cluster closest to the data point i.

K-means clustering is performed on the selected historical data of blending and coal calorific value based on different cluster numbers. When the number of clusters is 5, the silhouette coefficient is the highest, reaching 0.77707. In this case, the fuel characteristics distribution is divided into 5 clusters. The fuel characteristics of the data points within each cluster are similar. Relatively speaking, clustering can be used to obtain a more stable calorific value of fuel fed in the boiler. In view of this, follow-up research is carried out based on the historical operation data of the center data of the 5th cluster, where the blending ratio is about 1.15 and the coal calorific value is 24688 KJ/kg.

The data delay processing submodule is configured to select, from the historical operation data, a variable load condition segment where the boiler inlet fuel amount changes and the main air volume parameters of primary air and secondary air remain unchanged, analyze the delay of the change of the boiler outlet steam flow and the boiler inlet fuel amount, and eliminate the time difference of response to the data about boiler outlet steam flow and boiler inlet fuel amount in a subsequent process.

Figure 2:
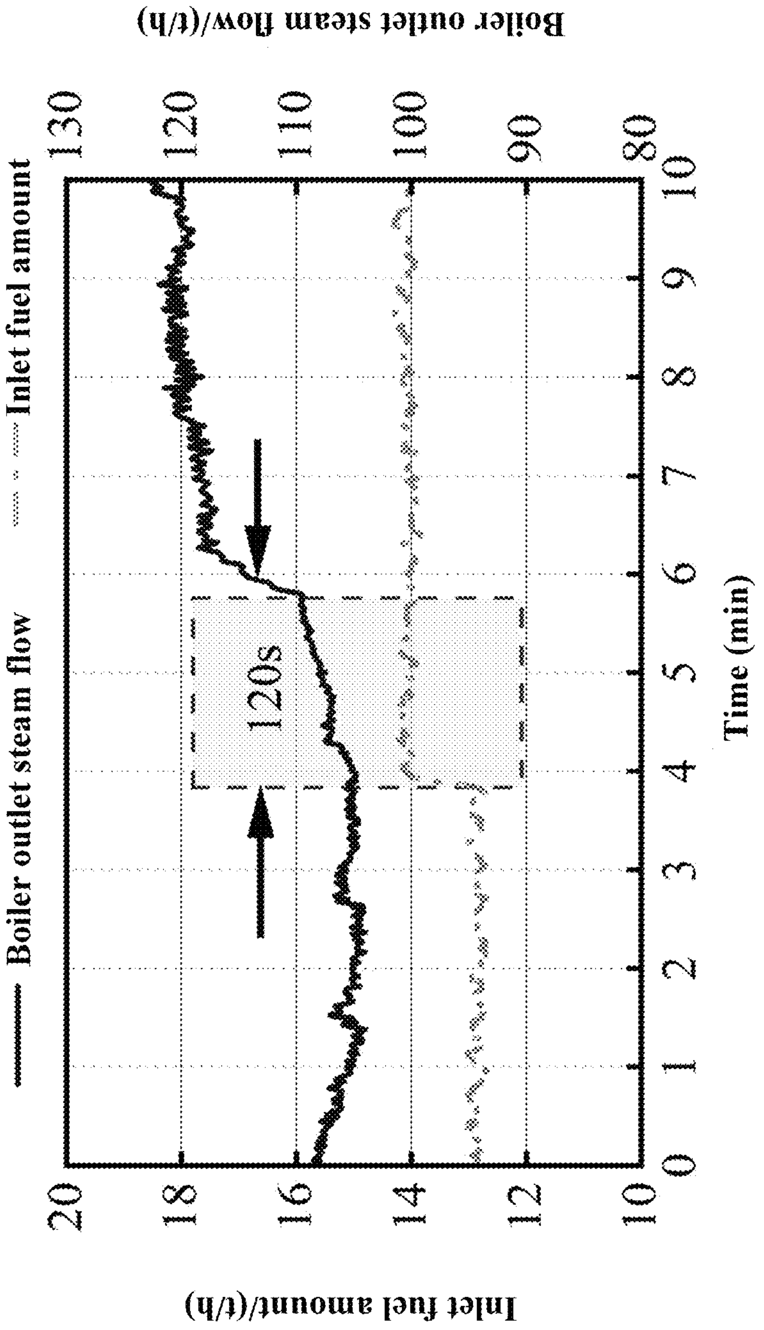
FIG. 2 is an analysis chart of fuel consumption-steam flow time delay of units.

As shown in FIG. 2, the fuel consumption-steam flow delay is analyzed for unit #2. After the boiler inlet fuel consumption increases by 120 s, the steam flow increases accordingly. Therefore, in the subsequent modeling process of a fuel consumption-steam flow fitting function, the influence of the 120 s pure delay needs to be eliminated to ensure the accuracy of the established mapping relationship.

The delay analysis of other units is shown in Table 1. Similarly, in the subsequent construction process of the fuel consumption-steam flow model, the historical data of each unit needs to be delayed.

TABLE 1

Fuel consumption-steam flow delay of units #0-#5

| Unit No. | Fuel consumption-steam flow delay/(s) |
|---|---|
| 0 | 95 |
| 1 | 75 |
| 2 | 120 |
| 3 | 100 |
| 4 | 95 |
| 5 | 75 |

The data filtering submodule further performs data filtering on the data about the boiler outlet steam flow and the boiler inlet fuel amount after data delay processing, and uses a Savitzky-Golay filter to filter the data in consideration of the data characteristics of the boiler inlet fuel amount to eliminate the high-frequency noise and jitter of a boiler inlet fuel signal.

Figure 3:
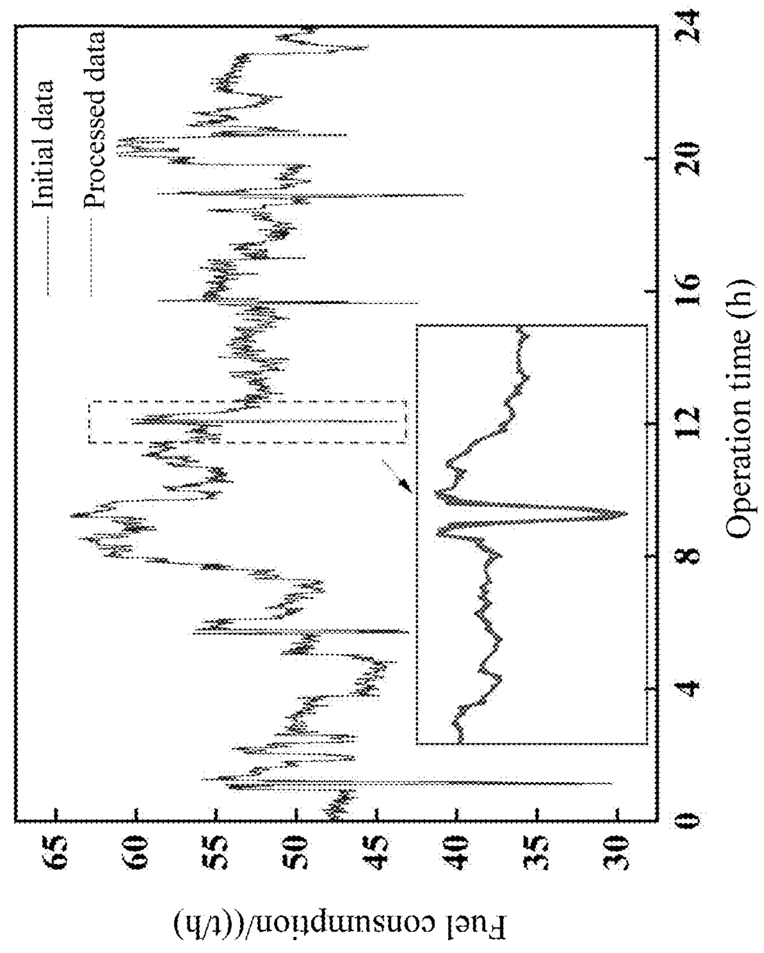
FIG. 3 shows Savitzky-Golay filtering results of fuel consumption.

FIG. 3 shows the filtering result of fuel consumption output from the Savitzky-Golay filter. For the filtered data segment, the change trend of the original data is retained, the noise of the original data is well removed and the fluctuation of the fuel consumption data is reduced.

The multi-unit load distribution optimization model sets start-stop constraints, capacity constraints and load ramp constraints for units with coal consumption economy as an objective, realizes the load distribution optimization of multiple units in an upper structure, and obtains the load distribution optimization plan of each unit with economy as an objective when the output of multiple units is determined; in the multi-unit load distribution optimization with fuel consumption economy as an objective, in order to balance the best economic benefits obtained by power plant operation, steam consumption rate, heat consumption rate, power supply cost, fuel consumption and other indicators are usually used to measure the economy of multi-unit operation. However, since the unit energy output forms include heat, electricity, gas, cold and other energy sources, the operation economy of multiple units cannot be evaluated just by steam consumption rate and heat consumption rate. Similarly, the power supply cost cannot be directly linked to the economy of the cogeneration unit. The fuel cost plays a decisive role in the change of the economic benefits of multiple units. The fuel consumption can directly reflect the economy of units when a power plant operates stably. Therefore, fuel consumption is considered herein as an objective function.

The fuel consumption-steam flow model is expressed as:

$$B_i = F_i(x_i) = a_i x_i^2 + b_i x_i + c_i$$

where, $B_i$ is the fuel consumption of an i-th unit, $F_i(\chi_i)$ is a steam flow function sign, $x_i$ is the boiler outlet steam flow of the i-th unit, and $a_i$, $b_i$ and $c_i$ are correlation coefficients of fuel consumption and boiler outlet steam flow.

The correlation coefficients in the fuel consumption-steam flow model of different units are shown in Table 2.

TABLE 2

Results of the heavy correlation coefficients of the fuel consumption-steam flow model of units #0-#5

| Unit No. | a | b | c |
|---|---|---|---|
| 0 | 0.00162 | −0.1411 | 43.5128 |
| 1 | 0.0000394 | 0.259 | 0.44603 |
| 2 | −0.00102 | 0.5624 | −11.73713 |
| 3 | −0.00224 | 1.043 | −46.60573 |
| 4 | −0.000249 | 0.3069 | 1.1132 |
| 5 | 0.0000527 | 0.0051 | 22.6079 |

The structure of the adaptive pollution and consumption reduction optimization algorithm is as follows: the first step is to initialize the total steam flow X of multiple units and the start-stop status of multiple units, the second step is to initialize algorithm parameters and particle properties, randomly generate a certain number of particles, and determine the position and velocity of each particle, and calculate particle fitness, the third step is to determine whether the particle fitness meets mutation conditions, and determine the position and velocity of each particle when the particle fitness meets the mutation conditions; the fourth step is to determine the steam flow $x_i$ of each unit through the particle fitness calculation, and the fifth step is to output the steam flow $x_i$ of each unit when the constraint on steam flow consumed for sludge drying and the constraint on total steam flow are met; the sixth step is to return to update the particle velocity and particle position and re-calculate the particle fitness when the constraints are not met.

The algorithm solution stability of the adaptive pollution and consumption reduction optimization algorithm under different load conditions is shown. Through 10 repeated experiments, the optimization stability of the algorithm under various load conditions such as 700 t/h, 800 t/h, 900 t/h and 1000 t/h is explored. The results are shown in Table 3. The results show that a small standard deviation of fuel consumption can be figured out under different load conditions, further demonstrating the stability of the constructed optimization model in the load distribution optimization problem.

TABLE 3

Optimization result statistics under different load conditions

| Total steam flow (t/h) | Fuel consumption (Min.) (t/h) | Fuel consumption (Max.) (t/h) | Average fuel consumption (t/h) | Standard deviation of fuel consumption (t/h) |
|---|---|---|---|---|
| 700 | 189.47 | 189.61 | 189.54 | 0.0501 |
| 800 | 211.52 | 211.74 | 211.59 | 0.0775 |
| 900 | 234.83 | 236.17 | 235.44 | 0.4273 |
| 1000 | 258.03 | 260.132 | 258.76 | 0.8235 |

Figure 4:
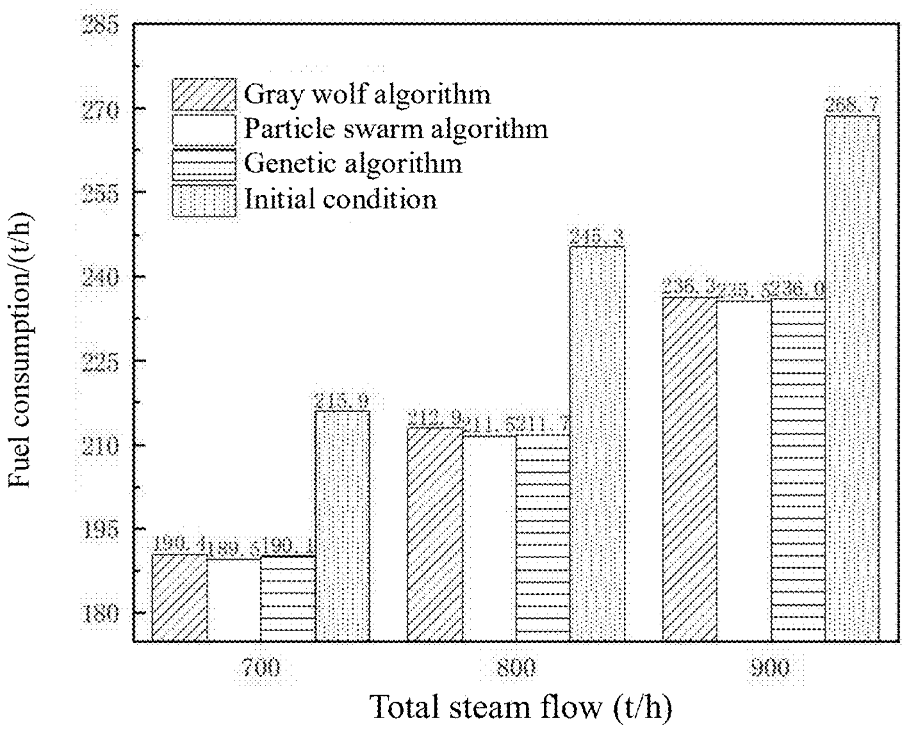
FIG. 4 shows optimization effects of different algorithms.

FIG. 4 shows average optimization results of different algorithms running 10 times. Compared with traditional genetic algorithms and gray wolf algorithms, the adaptive pollution and consumption optimization algorithm of the present invention (i.e. Particle swarm algorithm) has a high global search capability and an ability to jump out of the local optimal solution during the solving process, and shows good optimization effects in static optimization.

Figure 5:
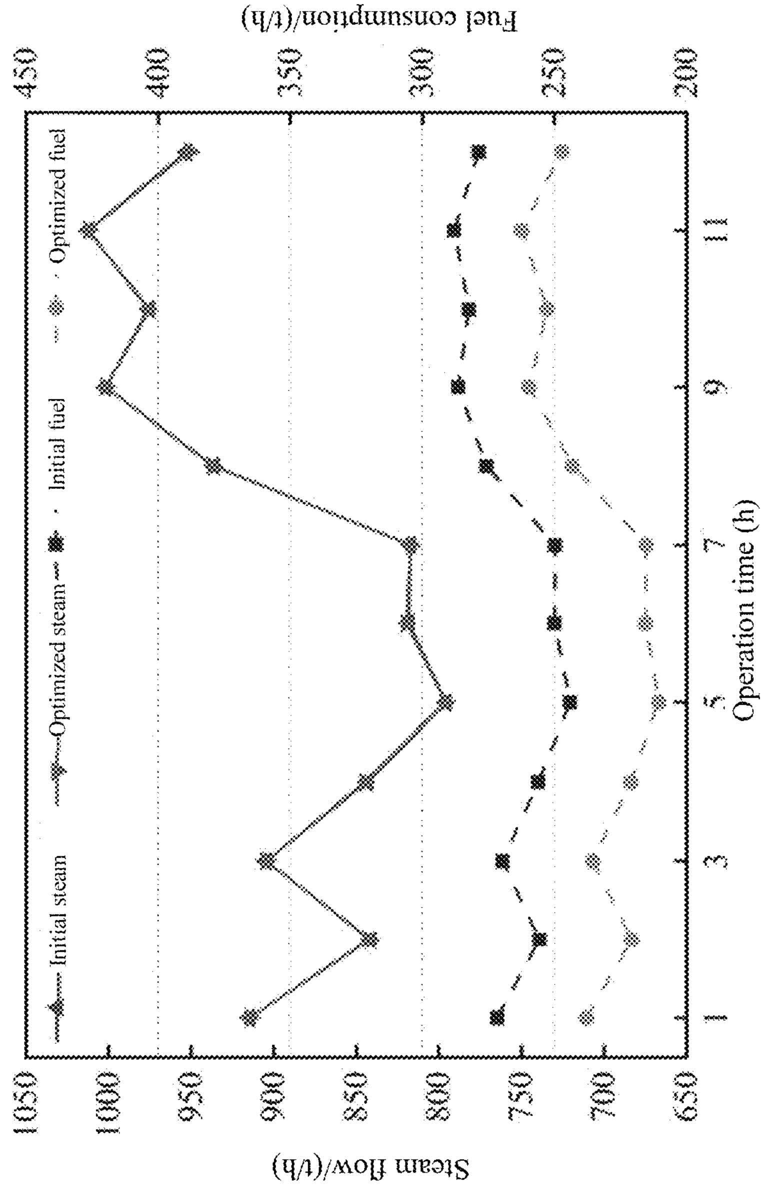
FIG. 5 shows the multi-period load distribution optimization effect.

As shown in FIG. 5, the 12 h discrete steam flow is taken as a target steam flow in the historical data of units, and the maximum load change rate of each unit is set to 55 t/h. The 12 h discrete steam flow is input into the optimization model, and the model can converge to a given value well. On this basis, by optimizing the load distribution of six units, the total fuel consumption is reduced by more than 20% compared with that under the original working conditions during the 12 h operation. The optimization results show that the constructed model has a good multi-period load distribution optimization effect.

The multi-unit flexible operation optimization model redistributes the steam flow involved in sludge drying, thereby obtaining the minimum total fuel consumption of multiple units within the time period. Therefore, unlike the load distribution optimization model, the multi-unit flexible operation optimization model prioritizes the optimization of the total steam flow of multiple units. The optimization process is as follows:

(1) First, 4 days of data with hourly steam consumption for sludge drying $x'_t$=10 t/h, $x'_t$=15/h, $x'_t$=20 t/h, $x'_t$=25 t/h (the maximum steam consumption of the sludge dryer is 30 t/h) are selected from the historical data and the average steam flow and average fuel consumption per hour are recorded.

(2) The hourly steam consumption for sludge drying is subtracted from the hourly load to obtain a non-adjustable benchmark load used by a unit to prepare compressed air, generate electricity for turbines, and supply heat to users.

(3) On the basis of the benchmark load, combined with the total fuel consumption-total steam flow model, the distribution of the steam flow involved in sludge drying throughout the day is further optimized by the multi-unit flexible operation optimization model to obtain the flexible load distribution.

Figure 6:
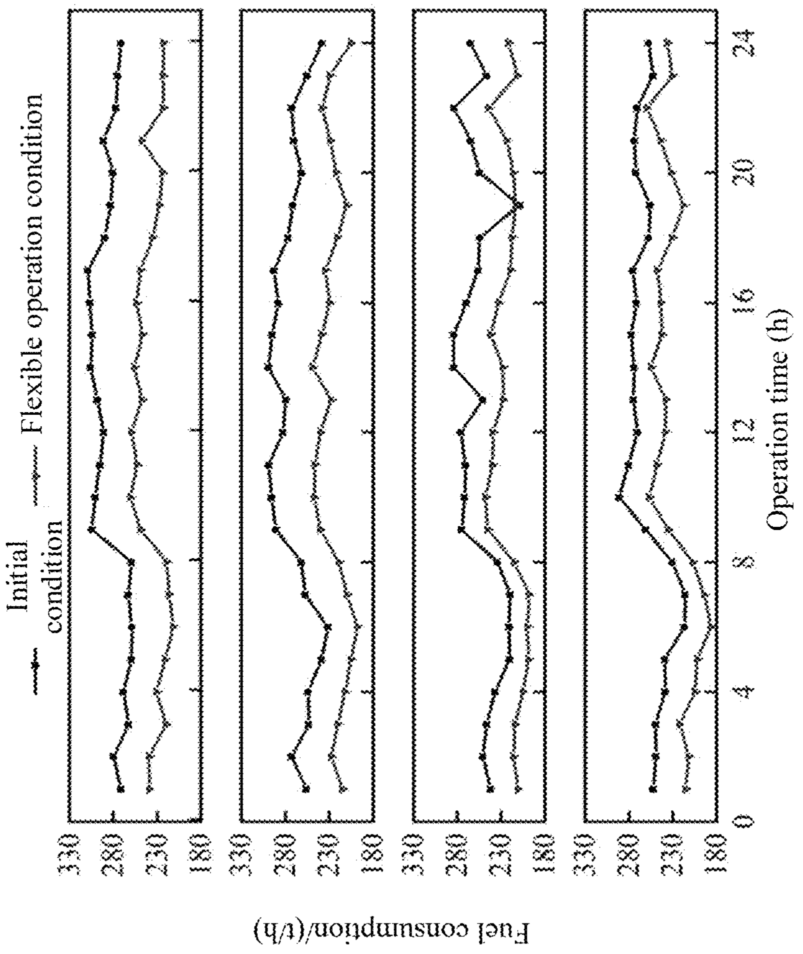
FIG. 6 shows fuel consumption under different working conditions.

As shown in FIG. 6, the distribution results show that a flexible load distribution module has good optimization performance under different operation conditions, and compared with the original operation data, the flexible load distributions under the four operating conditions achieve multi-source fuel savings of 16.66%, 16.68%, 12.51% and 11.48% respectively, which helps to improve the economy of multi-source fuel units.

Figure 7:
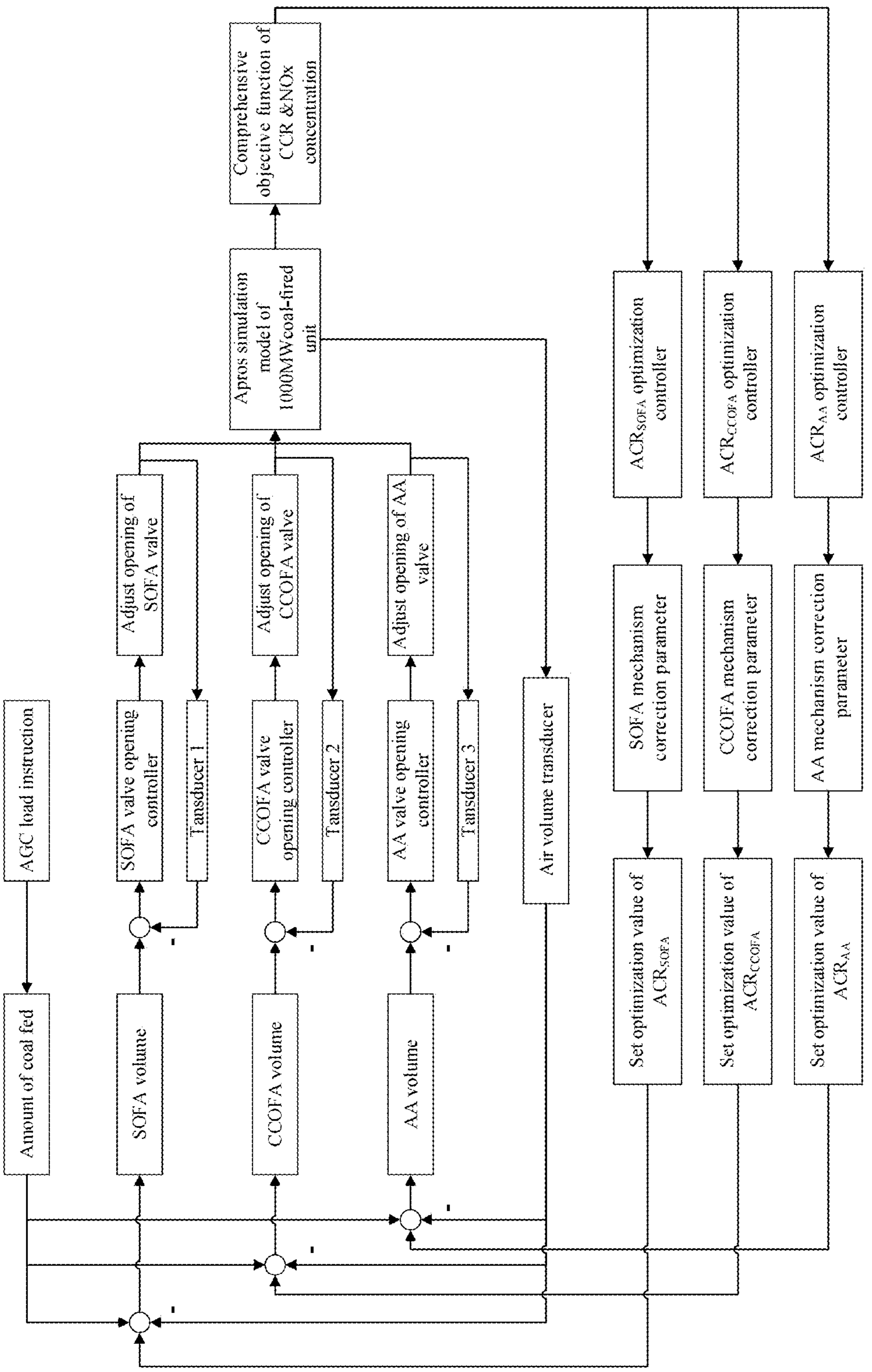
FIG. 7 is a structural diagram of an online optimization algorithm for stratified air distribution of a boiler.

As shown in FIG. 7, in the optimization model of stratified air distribution optimization for the boiler, after the air-coal ratio setting value combined with the AGC (automatic generation control) load instruction is issued, a DCS directly calculates an amount of coal fed, a current boiler inlet air volume is further calculated according to the amount of coal fed, and the boiler inlet volume control of auxiliary air, close-coupled over fire air and separated over fire air is realized by valve control; further calculations are performed to obtain the comprehensive objective function value of current kilowatt-hour coal consumption and NOx emission concentration, and data is transmitted to an $ACR_{AA}$ optimization controller, an $ACR_{CCOFA}$ optimization controller and an $ACR_{SOFA}$ optimization controller to optimize three air-coal ratios online, thus completing a round of online optimization control cycle. Moreover, in the online optimization loop of the three air-coal ratios, the mechanism correction parameters of the auxiliary air, compact burnout air and separated burnout air are added to achieve parameter fine-tuning of control models under different initial conditions, so as to improve the response speed of one of the air-coal ratios to the objective function and make the algorithm converge better. Under multiple combustion conditions, the values of the mechanism correction parameters of auxiliary air, compact burnout air and separated burnout air are between 1 and 1.1, which depends on the NOx emission concentration and coal consumption per kilowatt-hour under the initial conditions. By adding this module, part of the prior mechanism knowledge is integrated into the optimization control method to improve the generalization of the model.

In the optimization model of total air volume optimization for the boiler and stratified air distribution optimization for the boiler, fuel price, boiler operation data and simulation data are substituted into a fuel cost model and a denitrification cost model to calculate fuel cost and denitrification cost, and the weight in the comprehensive objective function is further defined from the perspective of cost; the comprehensive objective function value of the coal consumption per kilowatt-hour and the NOx concentration is expressed as:

$$J_{MESC} = pM_{CCR} + qM_{NOx}$$

where, $J_{MESC}$ represents the comprehensive objective function value of coal consumption per kilowatt-hour and NOx concentration, p and q are weight factors of fuel cost and denitrification cost in the comprehensive objective function and satisfy p+q=1; $M_{CCR}$ represents the fuel cost; $M_{NOx}$ represents the denitrification cost.

The coal consumption per kilowatt-hour is expressed as:

$$b = 10^6 B_c Q_{net,ar}/29300P$$

wherein, b is the coal consumption per kilowatt-hour of a unit; $B_c$ is the amount of coal fed to the boiler; $Q_{net,ar}$ is the low calorific value of the coal fed into the boiler;

and P is the active power of a unit.

The fuel cost is expressed as:

$$M_{CCR} = b \times \frac{m_c}{10^6}$$

where, b is the standard coal consumption per kilowatt-hour of a unit; $m_c$ is the fuel price; and $M_{CCR}$ is the fuel cost.

The denitrification cost is expressed as:

$$M_{NOx} = c_{NO_x} \times B \times V_{gv} \times Q_{NH_3} \times \lambda \times \frac{M_{NH_3}}{P\gamma}$$

where, $M_{NOx}$ is the denitrification cost; $C_{NOx}$ is the NOχ concentration at the boiler outlet; B is the amount of coal fed; $V_{gv}$ is the dry flue gas volume; $Q_{NH3}$ is the theoretical amount of ammonia required for NOχ removal; λ is ammonia nitrogen ratio; $M_{NH_3}$ is liquid ammonia cost; γ is unit load rate.

The constraints on the air-coal ratio of auxiliary air, the air-coal ratio of close-coupled over fire air and the air-coal ratio of separated over fire air are:

$$\psi_{ACR_{AA}min} < \psi_{ACR_{AA}} < \psi_{ACR_{AA}max}$$

$$\psi_{ACR_{CCOFA}min} < \psi_{ACR_{CCOFA}} < \psi_{ACR_{CCOFA}max}$$

$$\psi_{ACR_{SOFA}min} < \psi_{ACR_{SOFA}} < \psi_{ACR_{SOFA}max}$$

wherein, $\psi_{ACR_{AA}}$, $\psi_{ACR_{CCOFA}}$ and $\psi_{ACR_{SOFA}}$ represent the values of the air-coal ratio of auxiliary air, the air-coal ratio of close-coupled over fire air and the air-coal ratio of separated over fire air, respectively; $\psi_{ACR_{AA}min}$ and $\psi_{ACR_{AA}max}$ represent the minimum and maximum values of the air-coal ratio of auxiliary air under normal operating conditions, respectively; $\psi_{ACR_{CCOFA}min}$ and $\psi_{ACR_{CCOFA}max}$ represent the minimum and maximum values of the air-coal ratio of close-coupled over fire air under normal operating conditions, respectively; $\psi_{ACR_{SOFA}min}$ and $\psi_{ACR_{SOFA}max}$ represent the minimum and maximum values of the air-coal ratio of separated over fire air under normal operating conditions, respectively.

In the optimization model of total air volume optimization for the boiler and stratified air distribution optimization for the boiler, a multi-input dynamic extremum seeking control algorithm is introduced for the problem of stratified air distribution optimization for the boiler, and parameter setting and closed-loop simulation verification are carried out under stable load and variable load conditions. The main parameters of the multi-input dynamic extremum seeking control algorithm include high-pass filter parameter ωh, low-pass filter parameter ωl, adaptive gain parameter k, disturbance amplitudes α, β and disturbance frequency ω, which have a certain influence on the convergence speed, stability and extremum seeking accuracy of the control algorithm. Therefore, on the basis of considering improving the extremum seeking accuracy of the system, the convergence speed and stability of the algorithm are improved by setting the parameters such as high-pass filter parameter ωh, low-pass filter parameter ωl, adaptive gain parameter k, disturbance amplitude α, β and disturbance frequency ω.

Table 4 shows the main parameters of the multi-input extremum seeking control algorithm. During the parameter setting of the multi-input dynamic extremum seeking control algorithm, in the structural design of each input parameter loop, two control structures that adapt to a variation range of the comprehensive objective function are designed. In actual control, the specific control structure can also be selected on the basis of prior mechanism knowledge and initial combustion state parameters. It should be noted that the selection and combination of specific control structures will not cause adverse guidance on the convergence of the algorithm. This is because the three air-coal ratio parameters are highly coupled to each other and have different effects on the comprehensive objective function under different load conditions. In the solving process of extremum seeking, different air-coal ratio parameter solution sets can be searched in the solution space to meet the requirements of extremum optimization of the comprehensive objective function.

TABLE 4

Main parameters of the multi-input extremum seeking control algorithm

| Model No. | Parameter | | | | | |
|---|---|---|---|---|---|---|
| Model 1 | $\alpha_{11}$ | $\omega_{11}$ | $\beta_{11}$ | $k_{11}$ | $\omega_{h11}$ | $\omega_{l11}$ |
| | 0.11 | 0.3 | 0.005 | −6 | 5 | 10 |
| | $\alpha_{12}$ | $\omega_{12}$ | $\beta_{12}$ | $k_{12}$ | $\omega_{h12}$ | $\omega_{l12}$ |
| | 0.15 | 1.2 | 0.004 | −0.6 | 4.2 | 30 |
| Model 2 | $\alpha_{21}$ | $\omega_{21}$ | $\beta_{21}$ | $k_{21}$ | $\omega_{h21}$ | $\omega_{l21}$ |
| | 0.3 | 0.12 | 0.01 | −3 | 4.5 | 20 |
| | $\alpha_{22}$ | $\omega_{22}$ | $\beta_{22}$ | $k_{22}$ | $\omega_{h22}$ | $\omega_{l22}$ |
| | 0.15 | 1.2 | 0.004 | −0.4 | 4.2 | 30 |
| Model 3 | $\alpha_{31}$ | $\omega_{31}$ | $\beta_{31}$ | $k_{31}$ | $\omega_{h31}$ | $\omega_{l31}$ |
| | 0.3 | 0.15 | 0.01 | −3 | 4.5 | 20 |
| | $\alpha_{32}$ | $\omega_{32}$ | $\beta_{32}$ | $k_{32}$ | $\omega_{h32}$ | $\omega_{l32}$ |
| | 0.15 | 1.2 | 0.004 | −0.4 | 4.2 | 30 |

Notes:

Related parameters of model 1:

(1) $\alpha_{11}$ is the disturbance value of control structure 1 in model 1; $\omega_{11}$ is the disturbance frequency of control structure 1 in model 1; $\beta_{11}$ is the disturbance value of control structure 1 in model 1; $k_{11}$ is the adaptive gain parameter of control structure 1 in model 1; $\omega_{h11}$ is the high-pass filter parameter of control structure 1 in model 1; $\omega_{l11}$ is the low-pass filter parameter of control structure 1 in model 1; (2) $\alpha_{12}$ is the disturbance value of control structure 2 in model 1; $\omega_{12}$ is the disturbance frequency of control structure 2 in model 1; $\beta_{12}$ is the disturbance value of control structure 2 in model 1; $k_{12}$ is the adaptive gain parameter of control structure 2 in model 1; $\omega_{h12}$ is the high-pass filter parameter of control structure 2 in model 1; $\omega_{l12}$is the low-pass filter parameter of control structure 2 in model 1.

Related parameters of model 2:

(1) $\alpha_{21}$ is the disturbance value of control structure 2 in model 1; $\omega_{21}$ is the disturbance frequency of control structure 2 in model 1; $\beta_{21}$ is the disturbance value of control structure 2 in model 1; $k_{21}$ is the adaptive gain parameter of control structure 2 in model 1; $\omega_{h21}$ is the high-pass filter parameter of control structure 2 in model 1; $\omega_{l21}$ is the low-pass filter parameter of control structure 2 in model 1; (2) $\alpha_{22}$ is the disturbance value of control structure 2 in model 2; $\omega_{22}$ is the disturbance frequency of control structure 2 in model 2; $\beta_{22}$ is the disturbance value of control structure 2 in model 2; $k_{22}$ is the adaptive gain parameter of control structure 2 in model 2; $\omega_{h22}$ is the high-pass filter parameter of control structure 2 in model 2; $\omega_{l22}$ is the low-pass filter parameter of control structure 2 in model 2.

Related parameters of model 3:

(1) $\alpha_{31}$ is the disturbance value of control structure 3 in model 1; $\omega_{31}$ is the disturbance frequency of control structure 3 in model 1; $\beta_{31}$ is the disturbance value of control structure 3 in model 1; $k_{31}$ is the adaptive gain parameter of control structure 3 in model 1; $\omega_{h31}$ is the high-pass filter parameter of control structure 3 in model 1; $\omega_{l31}$ is the low-pass filter parameter of control structure 3 in model 1; (2) $\alpha_{32}$ is the disturbance value of control structure 3 in model 2; $\omega_{32}$ is the disturbance frequency of control structure 3 in model 2; $\beta_{32}$ is the disturbance value of control structure 3 in model 2; $k_{32}$ is the adaptive gain parameter of control structure 3 in model 2; $\omega_{h32}$ is the high-pass filter parameter of control structure 3 in model 2; $\omega_{l32}$ is the low-pass filter parameter of control structure 3 in model 2.

Embodiment 2

Figure 8:
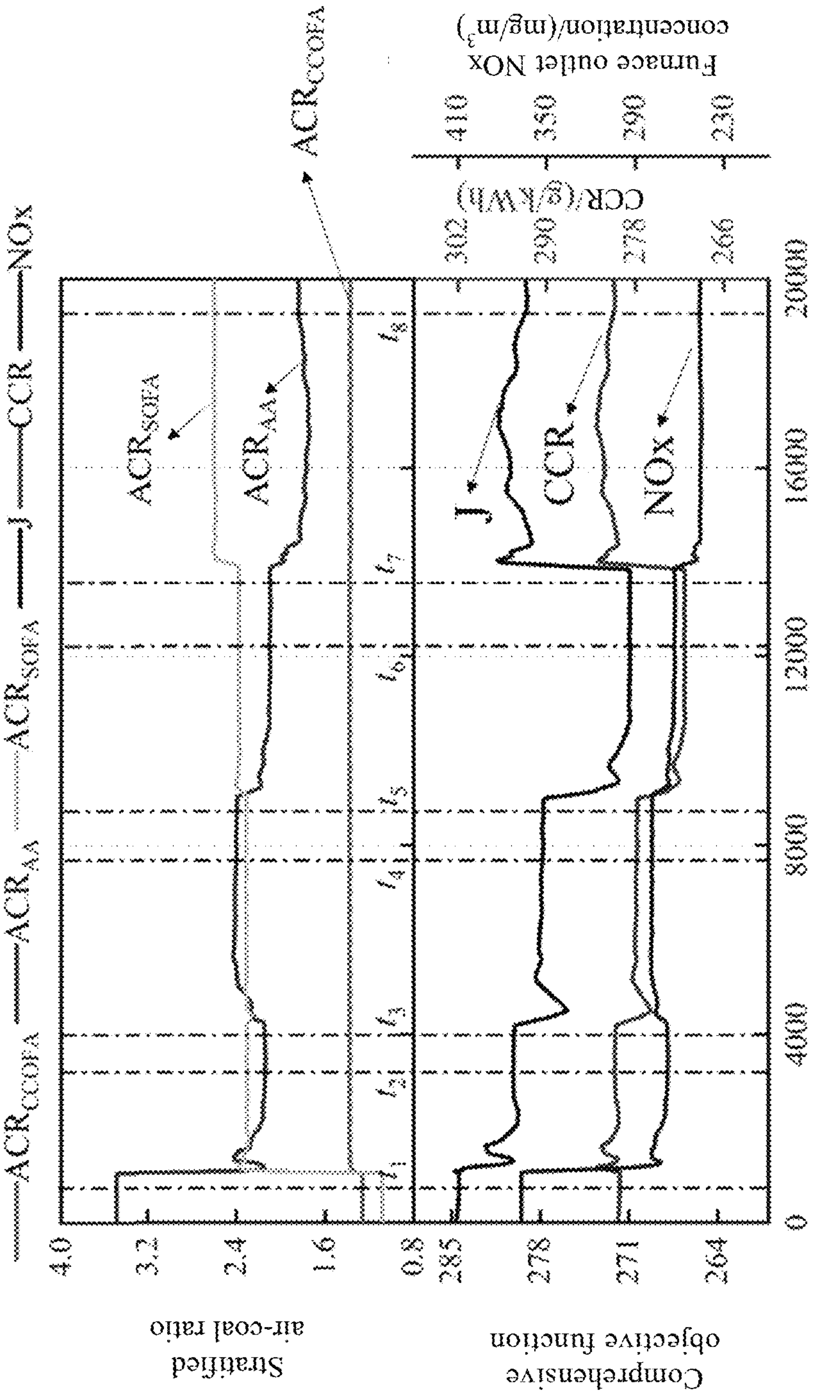
FIG. 8 shows a multi-objective optimization control process for variable load conditions.

As shown in FIG. 8, the actual typical unit operating condition data that meets the optimization of total air volume in the furnace is input into a simulation model as an initial condition. The system initially stabilizes under an operation condition of low coal consumption per kilowatt-hour (CCR) and high NOx, where the initial value of the air-coal ratio of auxiliary air ($ACR_{AA}$) is 3.5, the initial value of the air-coal ratio of close-coupled over fire air ($ACR_{CCOFA}$) is 1.26, and the initial value of the air-coal ratio of separated over fire air ($ACR_{SOFA}$) is 1.09. At t1, a control model is connected to the adaptive pollution and consumption reduction algorithm simulation system. At t2, the control model basically converges. Compared with the initial condition, under the optimized condition, at t2, the system slightly increases CCR from 280.1 g/kWh to 280.7 g/kWh, reduces the NOx concentration from 366.92 mg/m$^3$ to 267.96 mg/m$^3$, and converges for $ACR_{AA}$, $ACR_{CCOFA}$, and $ACR_{SOFA}$ at 2.14, 1.37, and 2.30, respectively.

At $t_3$, a load reduction instruction is given, and the system slowly reduces the load from 1000 MW to 950 MW and converges for $ACR_{AA}$, $ACR_{CCOFA}$, and $ACR_{SOFA}$ at 2.40, 1.38, and 2.31, respectively. The CCR decreased accordingly with the decrease of boiler load in a high load range, and is affected by the change of air volume, and stabilized to 277.81 g/kWh at t4.

Similarly, after the system quickly reduces the load from 950 MW to 900 MW during a period of t5 to t6, the comprehensive objective function value $J_{MESC}$ decreases to 270.91, but unlike what happened at t3, the load change rate at t5 is twice the original by setting parameters for the model.

At $t_7$, a load increase instruction is given, and the rate is twice that at t5. The system quickly increases the load from 900 MW to 1000 MW, and converges for $ACR_{AA}$, $ACR_{CCOFA}$, and $ACR_{SOFA}$ at 1.83, 1.37, and 2.60, respectively. At this time, the CCR reaches the optimal value of 280.80 g/kWh under the current load condition, and the NOx concentration drops to 246.32 mg/m$^3$. After multiple rounds of online optimization, the comprehensive objective function value $J_{MESC}$ at t8 is lower than that under the initial condition and under the optimized condition, reaching 279.04 g/kWh, and a good multi-objective optimization effect is obtained.

The optimization results are shown in Table 5. The total air volume does not change greatly before and after the four rounds of optimization. The reduction of the comprehensive objective function value is achieved by optimizing the stratified air distribution for the boiler. In the three rounds of optimization under variable load conditions with different rates, load increase and decrease at different rates have little effect on an ACR solution set, and only the $ACR_{AA}$ is adjusted in a small range, showing the high stability of the model. In addition, in this embodiment, in order to improve the convergence ability of the model under variable load conditions, the mechanism correction parameter of loop 1, i.e., an $ACR_{AA}$ loop, is adjusted from 1 to 1.05. The results shows that after multiple rounds of online optimization, the comprehensive objective function value $J_{MESC}$ at t8 is lower than that under the initial condition and under the optimized condition, reaching 279.04, and a good multi-objective optimization effect is obtained, and the positive role of the mechanism correction parameter in improving the convergence ability of the model is further verified.

The actual application results show that under complex combustion conditions such as high coal consumption per kilowatt-hour and high NOx, low coal consumption kilowatt-hour and high NOx, and high coal consumption kilowatt-hour and low NOx, the unit's coal consumption per kilowatt-hour and NOx emission concentration are both reduced, with the maximum reduction reaching 9 g/kWh and 120 mg/m$^3$ respectively. The model has good stability and high adaptive optimization capability under variable load conditions and coal quality disturbance conditions.

TABLE 5

Multi-objective optimization effect under variable load conditions

| | Unit load (MW) | $ACR_{AA}$ | $ACR_{CCOFA}$ | $ACR_{SOFA}$ | NO*x* (mg/m$^3$) | CCR (g/kWh) | $J_{MESC}$ |
|---|---|---|---|---|---|---|---|
| Initial condition | 1000 | 3.50 | 1.26 | 1.09 | 366.92 | 280.1 | 284.45 |
| Optimized condition | 1000 | 2.14 | 1.37 | 2.30 | 267.96 | 280.7 | 280.10 |
| Variable load condition 1 | 950 | 2.40 | 1.38 | 2.31 | 278.49 | 277.81 | 277.88 |
| Variable load condition 2 | 900 | 2.09 | 1.38 | 2.37 | 263.04 | 271.33 | 270.91 |
| Variable load condition 3 | 1000 | 1.83 | 1.37 | 2.60 | 246.32 | 270.80 | 279.04 |

The invention is described in detail above in combination with the embodiments, but the contents described are only specific embodiments of the invention, and cannot be understood as limiting the scope of the invention. It should be pointed out that for those of ordinary skills in the art, without departing from the concept of the invention, all modifications and improvements made according to the application scope of the invention should still fall within the scope of the invention.

What is claimed is:

1. An intelligent pollution and carbon reduction method based on combustion control and load distribution, using a data processing layer, a multi-unit load distribution and operation optimization layer and a single-unit boiler multi-objective combustion optimization layer; wherein the data processing layer, the multi-unit load distribution and operation optimization layer and the single-unit boiler multi-objective combustion optimization layer are embedded in a power plant information system in the form of modules, and communicate with the power plant information system in real time;

the data processing layer comprises a data clustering submodule, a data delay processing submodule, and a data filtering submodule and is configured to acquire historical data about fuel amount and fuel-specific properties from the power plant information system, and carry out screening, clustering, time delay processing and data filtering on offline data of multi-source fuel blending combustion units to cluster and deeply segment data about multi-source fuels with different calorific values and blending ratios into multiple operating condition intervals to obtain stable data suitable for subsequent modeling;

the multi-unit load distribution and operation optimization layer comprises a multi-unit load distribution optimization model and a multi-unit flexible operation optimization model;

the multi-unit load distribution optimization model is configured to, based on the data processing layer, obtain stable data suitable for modeling, cluster and segment the data about multi-source fuels with different calorific values and blending ratios into sub-intervals with similar fuel characteristics, and on this basis establish a fuel consumption-steam flow model with different fuel characteristics for different units; further, with coal consumption economy as an objective, set start-stop constraints, capacity constraints and load ramp constraints for units, and when the total thermal power load of the power plant changes, match the fuel data of the day with the historical operation data to obtain a stable fuel consumption-load mapping relationship, and distribute the real-time steam production of multiple units by using an adaptive pollution and consumption reduction optimization algorithm to achieve load distribution optimization for multiple units;

the multi-unit flexible operation optimization model is configured to, based on the multi-unit load distribution optimization model, according to sludge drying and the multi-source fuel pretreatment of biomass and domestic waste on the same day and in consideration of a steam flow required for sludge drying at each time, adopt the adaptive pollution and consumption reduction optimization algorithm for flexible load distribution, obtain a steam distribution method of the sludge/garbage drying process and a load distribution method of each multi-source fuel unit, and further optimize the steam flow distribution for multiple units hour by hour;

the single-unit boiler multi-objective combustion optimization layer is configured to, based on an optimization process of mechanism analysis, optimization model construction, closed-loop simulation verification and parameter adjustment, firstly analyze the mechanism of key operating parameters of boiler combustion, and in combined with a furnace combustion mechanism, determine air-coal ratios of auxiliary air, close-coupled over fire air, and separated over fire air as decision parameters, and further construct an optimization model of total air volume optimization for the boiler and stratified air distribution optimization for the boiler to optimize the total air volume distribution of the boiler, and carry out parameter setting and closed-loop simulation verification under stable load and variable load conditions, thereby achieving the improvement of unit energy efficiency and reduction of pollutant emissions.

2. The intelligent pollution and carbon reduction method based on combustion control and load distribution according to claim 1, wherein the data clustering submodule is configured to acquire the daily multi-source fuel blending ratio, the calorific value of coal entering the boiler, and the fuel calorific value of sludge and garbage from historical operation data, and cluster the data with the blending ratio and the fuel calorific value as variables, and segment the data into different fuel working conditions in consideration of the characteristics of the clustered data, wherein the calorific values and physical and chemical properties of fuels under the working conditions are similar, and the clustering effect is expressed as follows:

$$SC(i) = \frac{b(i) - a(i)}{\max\{a(i), b(i)\}}$$

where SC(i) is a clustering effect coefficient; a(i) is an average distance between each data point i and all other data points in the same cluster; b(i) is an average distance between the data point i and all data points in another cluster closest to the data point i;

the data delay processing submodule is configured to select, from the historical operation data, a variable load condition segment where the boiler inlet fuel amount changes and the main air volume parameters of primary air and secondary air remain unchanged, analyze the delay of the change of the boiler outlet steam flow and the boiler inlet fuel amount, and eliminate the time difference of response to the data about boiler outlet steam flow and boiler inlet fuel amount in a subsequent process;

the data filtering submodule further performs data filtering on the data about the boiler outlet steam flow and the boiler inlet fuel amount after data delay processing, and uses a Savitzky-Golay filter to filter the data in consideration of the data characteristics of the boiler inlet fuel amount to eliminate the high-frequency noise and jitter of a boiler inlet fuel signal.

3. The intelligent pollution and carbon reduction method based on combustion control and load distribution according to claim 1, wherein the fuel consumption-steam flow model is expressed as:

$$B_i = F_i(x_i) = a_i x_i^2 + b_i x_i + c_i$$

where, $B_i$ is the fuel consumption of an i-th unit, $F_i(\chi_i)$ is a steam flow function sign, $x_i$ is the boiler outlet steam flow of the i-th unit, and $a_i$, $b_i$ and $c_i$ are correlation coefficients of fuel consumption and boiler outlet steam flow.

4. The intelligent pollution and carbon reduction method based on combustion control and load distribution according to claim 1, wherein the objective function of fuel consumption is expressed as:

$$J_{eco} = \min\left(\sum_{i=1}^{n} B_i\right) = \min\left(\sum_{i=1}^{n} F_i(x_i)n\right)$$

where, $J_{eco}$ represents the objective function of fuel consumption, $B_i$ represents the fuel consumption of the i-th unit; $x_i$ is the load of the i-th unit, and the load of a circulating fluidized bed unit is characterized by main steam flow rate; n represents the number of units operating in the power plant; $F_i(\chi_i)$ represents the fuel consumption characteristic model of the i-th unit;

the setting start-stop constraints, capacity constraints and load ramp constraints for units is to optimize the load distribution of multiple units when the start-stop status of each unit is determined, and also set a unit steam balance constraint, a unit load constraint and a unit load ramp rate constraint;

the unit steam balance constraint is expressed as:

$$X = \sum_{i=1}^{n} x_i$$

where, X is the steam flow of multiple units, and $\chi_i$ is the steam flow of the i-th operating unit;

in order to maintain safe and stable operation of the units, the load of each unit needs to be controlled within a certain range, and the unit load constraint is expressed as:

$$x_{imin} < x_i < x_{imax}$$

where $\chi_{imin}$ is the minimum load of the i-th operating unit, and $\chi_{imax}$ is the maximum load of the i-th operating unit;

the unit load ramp rate constraint is expressed as:

$$0<|x_{it}-x_{i,t-1}|<\Delta tv_{i-}$$

$$0<|x_{it}-x_{i,t-1}|<\Delta tv_{i+}$$

where, $x_{it}$ and $x_{i,t-1}$ represent the main steam flow rates of the i-th unit at time t and the time before time t respectively; Δt represents the time of load change; $v_{i+}$ and $v_{i-}$ represent the load increase velocity and load decrease velocity of the i-th unit respectively.

5. The intelligent pollution and carbon reduction method based on combustion control and load distribution according to claim 1, wherein in the multi-unit flexible operation optimization model, the fuel consumption of multiple units is used as an objective function, but unlike the load distribution optimization model, the total fuel consumption within a period of time is used to measure the objective function of the flexible operation optimization model;

the total fuel consumption of the multiple units within the period of time is expressed as:

$$J'_{eco}=\min\left(\sum_{t=1}^{t'}B_t\Delta T\right)$$

where, $J'_{eco}$ represents the total fuel consumption of multiple units in a period of time, t' represents flexible operation time, $B_t$ represents the total fuel consumption of multiple units at time t, and ΔT represents a unit interval time;

the constraints for optimizing the steam flow of multiple units include a constraint on steam consumption for sludge drying and a constraint on total steam capacity;

the constraint on steam consumption for sludge drying is expressed as:

$$0<x'_t<x'_{max}$$

where, $x'_t$ represents the steam consumption for sludge drying at time t, and $x'_{max}$ represents the maximum steam consumption when a sludge dryer is running at full load;

the fuel consumption is reduced by redistributing the steam flow at each time, so that in the same time period, the total steam consumption for drying all the sludge is unchanged before and after optimization, and the constraint on total steam capacity is expressed as:

$$Q=Q'$$

where Q represents steam consumption for drying all sludge before optimization, and Q' represents steam consumption for drying all sludge after optimization.

6. The intelligent pollution and carbon reduction method based on combustion control and load distribution according to claim 1, wherein the structure of the adaptive pollution and consumption reduction optimization algorithm is as follows: the first step is to initialize the total steam flow X of multiple units and the start-stop status of multiple units, the second step is to initialize algorithm parameters and particle properties, randomly generate a certain number of particles, and determine the position and velocity of each particle, and calculate particle fitness, the third step is to determine whether the particle fitness meets mutation conditions, and determine the position and velocity of each particle when the particle fitness meets the mutation conditions; the fourth step is to determine the steam flow $x_i$ of each unit through the particle fitness calculation, and the fifth step is to output the steam flow $x_i$ of each unit when the constraint on steam flow consumed for sludge drying and the constraint on total steam flow are met; the sixth step is to return to update the particle velocity and particle position and recalculate the particle fitness when the constraints are not met.

7. The intelligent pollution and carbon reduction method based on combustion control and load distribution according to claim 1, wherein in the optimization model of total air volume optimization for the boiler and stratified air distribution optimization for the boiler, after the air-coal ratio setting value combined with the AGC (automatic generation control) load instruction is issued, a DCS directly calculates an amount of coal fed, a current boiler inlet air volume is further calculated according to the amount of coal fed, and the boiler inlet volume control of auxiliary air, close-coupled over fire air and separated over fire air is realized by valve control; further calculations are performed to obtain the comprehensive objective function value of current kilowatt-hour coal consumption and NOx emission concentration, and data is transmitted to an $ACR_{AA}$ optimization controller, an $ACR_{CCOFA}$ optimization controller and an $ACR_{SOFA}$ optimization controller to optimize three air-coal ratios online, thus completing a round of online optimization control cycle.

8. The intelligent pollution and carbon reduction method based on combustion control and load distribution according to claim 7, wherein in the optimization model of total air volume optimization for the boiler and stratified air distribution optimization for the boiler, fuel price, boiler operation data and simulation data are substituted into a fuel cost model and a denitrification cost model to calculate fuel cost and denitrification cost, and the weight in the comprehensive objective function is further defined from the perspective of cost; the comprehensive objective function value of the coal consumption per kilowatt-hour and the NOx concentration is expressed as:

$$J_{MESC}=pM_{CCR}+qM_{NOx}$$

where, $J_{MESC}$ represents the comprehensive objective function value of coal consumption per kilowatt-hour and NOx concentration, p and q are weight factors of fuel cost and denitrification cost in the comprehensive objective function and satisfy p+q=1; $M_{CCR}$ represents the fuel cost; $M_{NOx}$ represents the denitrification cost;

the coal consumption per kilowatt-hour is expressed as:

$$b=10^6B_cQ_{net,ar}/29300P$$

wherein, b is the coal consumption per kilowatt-hour of a unit; $B_c$ is the amount of coal fed to the boiler; $Q_{net,ar}$ is the low calorific value of the coal fed into the boiler; and P is the active power of a unit;

the fuel cost is expressed as:

$$M_{CCR} = b \times \frac{m_c}{10^6}$$

where, b is the coal consumption per kilowatt-hour of a unit; $m_c$ is the fuel price; and $M_{CCR}$ is the fuel cost;

the denitrification cost is expressed as:

$$M_{NOx} = c_{NO_x} \times B \times V_{gv} \times Q_{NH_3} \times \lambda \times \frac{M_{NH_3}}{P\gamma}$$

where, $M_{NOx}$ is the denitrification cost; $C_{NO\chi}$ is the $NO_\chi$ concentration at the boiler outlet; B is the amount of coal fed; $V_{gv}$ is the dry flue gas volume; $Q_{NH3}$ is the theoretical amount of ammonia required for $NO_\chi$ removal; $\lambda$ is ammonia nitrogen ratio; $M_{NH_3}$ is liquid ammonia cost; $\gamma$ is unit load rate.

9. The intelligent pollution and carbon reduction method based on combustion control and load distribution according to claim 7, wherein in the optimization model of stratified air distribution optimization for the boil, the constraints on the air-coal ratio of auxiliary air, the air-coal ratio of close-coupled over fire air, and the air-coal ratio of separated over fire air are:

$$\psi_{ACR_{AA}min} < \psi_{ACR_{AA}} < \psi_{ACR_{AA}max}$$

$$\psi_{ACR_{CCOFA}min} < \psi_{ACR_{CCOFA}} < \psi_{ACR_{CCOFA}max}$$

$$\psi_{ACR_{SOFA}min} < \psi_{ACR_{SOFA}} < \psi_{ACR_{SOFA}max}$$

wherein, $\psi ACR_{AA}$, $\psi ACR_{CCOFA}$, and $\psi_{ACR_{SOFA}}$ represent the values of the ratio of auxiliary air, the air-coal ratio of close-coupled over fire air and the air-coal ratio of separated over fire air, respectively; $\psi_{ACR_{AA}min}$ and $\psi_{ACR_{AA}max}$ represent the minimum and maximum values of the air-coal ratio of auxiliary air under normal operating conditions, respectively; $\psi_{ACR_{CCOFA}min}$ and $\psi_{ACR_{CCOFA}max}$ represent the minimum and maximum values of the air-coal ratio of close-coupled over fire air under normal operating conditions, respectively; $\psi_{ACR_{SOFA}min}$ and $\psi_{ACR_{SOFA}max}$ represent the minimum and maximum values of the air-coal ratio of separated over fire air under normal operating conditions, respectively.

* * * * *